(12) United States Patent
Tsurui

(10) Patent No.: US 8,253,998 B2
(45) Date of Patent: Aug. 28, 2012

(54) IMAGE FORMING APPARATUS AND IMAGE FORMING METHOD

(75) Inventor: Masaki Tsurui, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 570 days.

(21) Appl. No.: 12/343,891

(22) Filed: Dec. 24, 2008

(65) Prior Publication Data

US 2009/0174917 A1    Jul. 9, 2009

(30) Foreign Application Priority Data

Jan. 4, 2008   (JP) ................................ 2008-000018

(51) Int. Cl.
  *H04N 1/46* (2006.01)
  *H04N 1/40* (2006.01)
  *G06F 3/12* (2006.01)
  *G06K 1/00* (2006.01)
  *G06K 9/36* (2006.01)

(52) U.S. Cl. ......... 358/505; 358/1.15; 358/1.5; 358/1.6; 358/1.9; 358/471; 382/232

(58) Field of Classification Search .................. 358/505, 358/1.15, 483, 474, 1.6, 496, 1.9, 471, 1.5, 358/514; 382/232
See application file for complete search history.

(56) References Cited

U.S. PATENT DOCUMENTS

| | | | |
|---|---|---|---|
| 7,852,509 B2 * | 12/2010 | Miyamoto | ..................... 358/1.5 |
| 2009/0141320 A1 * | 6/2009 | Minamino | ..................... 358/512 |

FOREIGN PATENT DOCUMENTS

| | | |
|---|---|---|
| JP | 2003-234866 | 8/2003 |
| JP | 2004-080627 | 3/2004 |
| JP | 2006-014213 | 1/2006 |
| JP | 2006-20151 | 1/2006 |

* cited by examiner

*Primary Examiner* — Charlotte M Baker
*Assistant Examiner* — Rury Grisham
(74) *Attorney, Agent, or Firm* — Dickstein Shapiro LLP

(57) ABSTRACT

An image forming apparatus includes a reader connecting unit capable of being connected with an original document reader. The original document reader can be a color original document reader that reads original documents in color mode or a monochrome original document reader that reads original documents in monochrome mode. A control unit receives original document data from the original document reader connected to the reader connecting unit, subjects the original document data to prescribed processing corresponding to the format of the original document data and generates image data. Finally, an image forming unit forms an image based on the image data.

4 Claims, 4 Drawing Sheets

IMAGE FORMING APPARATUS AND IMAGE FORMING METHOD

CROSS-REFERENCE TO RELATED APPLICATIONS

The present application claims priority to and incorporates by reference the entire contents of Japanese priority document 2008-000018 filed in Japan on Jan. 4, 2008.

BACKGROUND OF THE INVENTION

1. Field of the Invention

The present invention relates to an image forming apparatus and an image forming method.

2. Description of the Related Art

Image forming apparatuses having scanner functions can be classified into image forming apparatuses with a monochromatic scanner function and image forming apparatuses with a color scanner function.

The data format when original documents are read using the monochromatic scanner function and the data format when original documents are read using the color scanner function are different. Therefore, different processing needs to be performed depending on whether the data is acquired with the monochromatic scanner function or the color scanner function.

Research and development is therefore proceeding in order to annul the differences in formats of the input image data to be processed to make the devices and processing more efficient. As disclosed in Japanese Patent Application Laid-open No. 2003-234866, one approach could be to prepare a conversion server device having a function for converting input image data into a prescribed format, and client devices can then acquire image data of the desired format from the conversion server device.

The technology disclosed in Japanese Patent Application Laid-open No. 2003-234866 requires the use of a conversion server device having a special function and that is connected to the client devices via a network. This causes the system to increase in size. It is also possible that use of the conversion server device at the desired time will not be possible because a number of client devices are sharing the conversion server device. This communication also takes place over a network. This means that the time for processing can change even when, for example, handling data for the same amount of information, depending on the state of traffic on the network.

An image forming apparatus equipped with a scanner unit creates an image from one of original document data (original document data of a first format) obtained by reading a document by using a monochromatic scanner function and original document data (original document data of a second format) obtained by reading a document by using a color scanner function. It is therefore possible to share the portions of the configuration bearing the burden of image formation by forming images based on data of a shared format after conversion after converting data of these formats temporarily to data of a prescribed shared format. For example, in the case of an image forming apparatus where one of a monochrome scanner unit and a color scanner unit is connected to a main body, this means that parts of the main body are shared. It is therefore possible to manufacture products of different specifications simply by replacing parts of the configuration that it is not possible to share.

It is therefore possible to share parts of the configuration without influencing the device scale of a main body portion by performing image-forming after temporarily creating desired data (common format) using the technology disclosed in Japanese Patent Application Laid-open No. 2003-234866.

However, the problems of use not being possible when desired and the time required for processing changing depending on the traffic conditions exist when the technology disclosed in Japanese Patent Application Laid-open No. 2003-234866 is used. This causes the technology to be ineffectual when viewed overall (when considering not just device scale but also ease of use).

SUMMARY OF THE INVENTION

It is an object of the present invention to at least partially solve the problems in the conventional technology.

According to an aspect of the present invention, there is provided an image forming apparatus including a reader connecting unit capable of being connected with an original document reader, the original document reader being one of a color original document reader that reads original documents in color mode and a monochrome original document reader that reads original documents in monochrome mode; a control unit that receives original document data from the original document reader connected to the reader connecting unit, subjects the original document data to prescribed processing corresponding to the format of the original document data and generates image data; and an image forming unit that forms an image based on the image data.

According to another aspect of the present invention, there is provided an image forming method realized on an image forming apparatus connectable with an original document reader, the original document reader being one of a color original document reader that reads original documents in color mode and a monochrome original document reader that reads original documents in monochrome mode. The image forming method includes receiving original document data from the original document reader; subjecting the original document data to prescribed processing corresponding to the format of the original document data and generating image data; and forming an image based on the image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail in the following with reference to the accompanying drawings. The following explanation takes a digital multifunction product as an example of an image forming apparatus. The image forming apparatus is not limited to a digital multifunction product.

Figure 1:
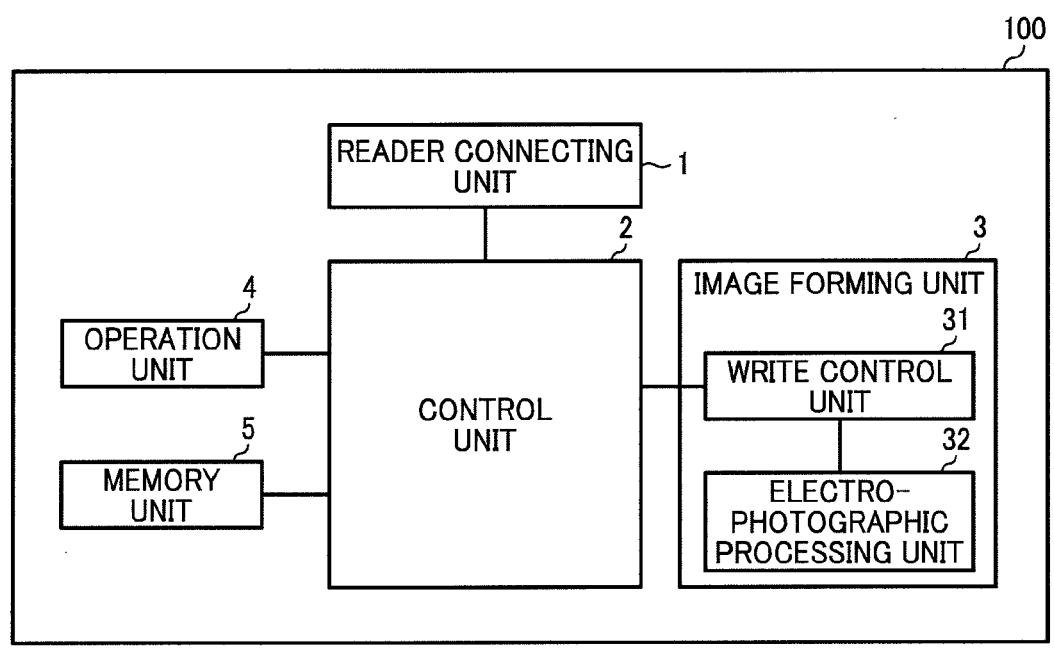
FIG. 1 is a block diagram of an example of an image forming apparatus according to an embodiment of the present invention.

FIG. 1 is a block diagram of an example of an image forming apparatus 100 according to an embodiment of the present invention. The image forming apparatus 100 includes a reader connecting unit 1 for connecting an original document reader (scanner unit) having a color scanning function or a monochrome scanning function, a control unit 2 that receives original document data from the original document reader connected to the reader connecting unit 1 and converts a format of the original document data acquired through the execution of prescribed processing to a desired format, an image forming unit 3 that forms images using the data of the desired format, an operation unit 4 that receives function execution operations from the user, etc., and a memory unit 5 that stores therein the original document data, etc. The image forming unit 3 includes a write control unit 31 that forms electrostatic latent images in accordance with the original document data received from the control unit 2, and an electro-photographic processing unit 32 that forms images by executing a series of electro-photographic processes.

Figure 2A:
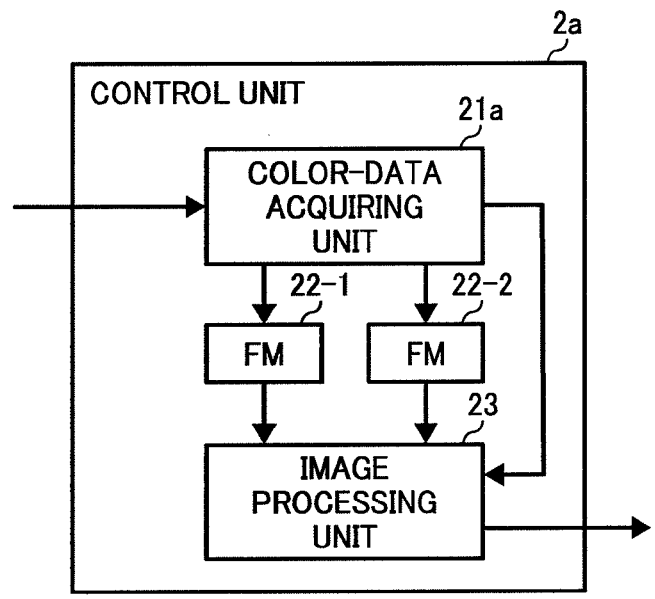
FIG. 2A is a block diagram of an example of a control unit shown in FIG. 1 when a color scanner unit is to be connected to the image forming apparatus.

The control unit 2 is now explained in detail. The control unit 2 adopts a configuration compatible with the specification of a scanner unit connected to the reader connecting unit 1. The configuration shown in FIG. 2A is adopted when the connected scanner unit is a color scanner unit having a color scanning function. A control unit (hereinafter, "control unit 2a") in FIG. 2A includes a color-data receiving unit 21a that receives color data from the reader connecting unit 1, a field memory (FM) 22-1 that temporarily stores one of R data and G data included in the input color data, which is RGB data, and a FM 22-2 that temporarily stores the remaining data, and an image processing unit 23 that generates image data for image formation based on the input color data.

Figure 2B:
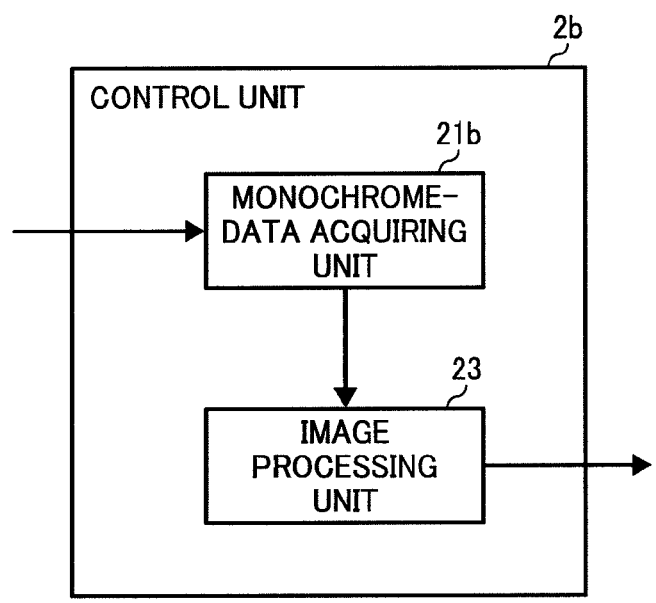
FIG. 2B is a block diagram of an example of a control unit shown in FIG. 1 when a monochromatic scanner unit is to be connected to the image forming apparatus.

The configuration in FIG. 2B is adopted when the connected scanner unit is a monochrome scanner unit having a monochrome scanning function. A control unit (hereinafter, control unit 2b) in FIG. 2B includes a monochrome-data receiving unit 21b that receives monochrome original document data from the reader connecting unit 1 and the image processing unit 23 having the same configuration as that included in the control unit 2a.

Figure 3:
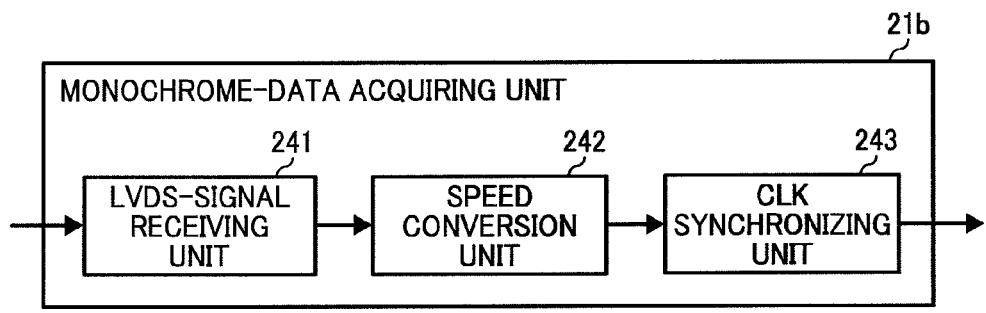
FIG. 3 is a block diagram of an example of a monochromatic-data receiving unit.

The monochrome-data receiving unit 21b adopts the configuration in FIG. 3 and includes an LVDS (Low-Voltage Differential Signaling)-signal receiving unit 241 that receives LVDS format monochrome original document data, a speed conversion unit 242 that converts speed of input signals (output signals or monochrome original document data from the LVDS-signal receiving unit 241), and a CLK synchronizing unit 243 that synchronizes speed-converted signals with a clock and outputs the synchronized signals to the image processing unit 23.

The image forming apparatus 100 can include any one of the control unit 2a and 2b depending on the specification of the scanner unit (original document reader) connected to the reader connecting unit 1.

Figure 4:
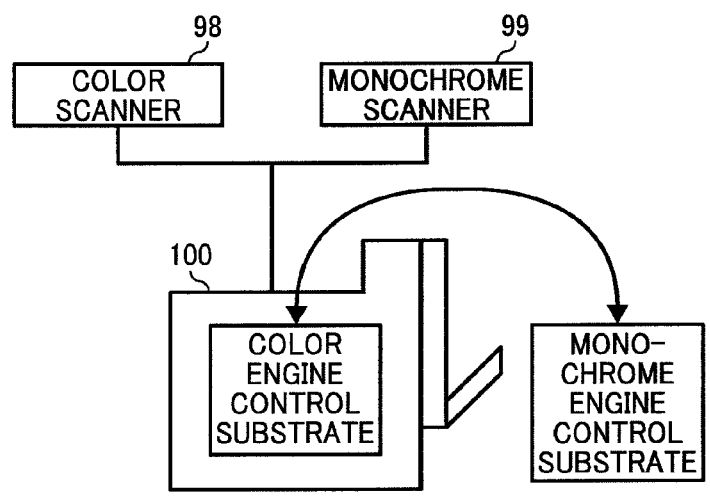
FIG. 4 is a block diagram of an example of a system of another embodiment of the present invention.

The system configuration is as in FIG. 4. This system includes the image forming apparatus 100 and one of a color scanner 98 and a monochrome scanner 99.

The image forming apparatus 100 includes a color engine control substrate (corresponding to the control unit 2a) for a model (specification) where the color scanner 98 is connected or includes a monochrome engine control substrate (corresponding to the control unit 2b) for a model where the monochrome scanner 99 is connected.

An operation when an original document is read from a scanner unit with the image forming apparatus connected is explained using FIGS. 1 to 3.

First, an explanation is given of the operation when the image forming apparatus 100 is provided with the control unit 2a, i.e. the operation for a situation where the color scanner 98 is connected to the image forming apparatus 100. The original document data output by the color scanner 98 to the control unit 2a is RGB (red-green-blue) data. The original document data is transmitted in the order R data, G data, B data using an LVDS format signal.

When an operation start instruction (scanning start operation) is received from a user via the operation unit 4 with an original document installed on the color scanner 98, the color-data receiving unit 21a of the control unit 2a (see FIG. 2A) receives color data from the color scanner 98 via the reader connecting unit 1 and sequentially outputs the data to the FM 22-1 and the FM 22-2 and then to the image processing unit 23 in order of reception. R data first received from the color scanner unit is output to the FM 22-1 (stored), and G data received second is output to the FM 22-2. B data received third is output to the image processing unit 23, and the R data stored in the FM 22-1 and the G data stored in the FM 22-2 are output together to the image processing unit 23 at the same time. This is to say that timing is adjusted so that each of the R, G, and B data is input at the same time to the image processing unit 23 using the FM 22-1 and the FM 22-2. The R data is stored in the FM 22-1 and the G data is stored in the FM 22-2.

The image processing unit 23 subjects the color data (RGB data) to various correction processing such as shading correction and inter-line correction and outputs the data after correction to the image forming unit 3 as image data for image formation.

At the image forming unit 3, the write control unit 31 forms an electrostatic latent image based on the image data for image formation received from the image processing unit 23, and the electro-photographic processing unit 32 executes a series of electro-photographic processes on the electrostatic latent image formed by the write control unit 31 so as to form an image.

Next, an explanation is given of the operation when the image forming apparatus 100 is provided with the control unit 2b, i.e. the operation for a situation where the monochrome scanner 99 is connected to the image forming apparatus 100. An explanation is only given of the operation of the control unit 2b that is different to that of the image forming apparatus the color scanner unit is connected to.

When an operation start instruction (scan start operation) is received from the user via the operation unit 4 with the original document installed at the monochrome scanner 99, the monochrome-data receiving unit 21b of the control unit 2b (see FIG. 2B) receives monochrome original document data from the monochrome scanner 99 via the reader connecting unit 1 and outputs the data to the image processing unit 23 after executing prescribed processing so as to subject the data to speed adjustment. The LVDS-signal receiving unit 241 in FIG. 3 receives the LVDS format monochrome original document data and passes the received monochrome original document data over to the speed conversion unit 242. The speed conversion unit 242 then outputs the received monochrome original document data at a prescribed timing in order that the latter-stage image processing unit 23 can correctly generate image data and converts the transmission speed of the data. The speed conversion unit 242 is, for example, a FIFO stack. The speed-converted monochrome original document data is output synchronously with a clock to enable receipt by the image processing unit 23 via the CLK synchronizing unit 243. The image processing unit 23 subjects the monochrome original document data to various correction processing such as shading correction and inter-line correction and outputs the data after correction to the image forming unit 3 as image data for image formation. The image forming unit 3 forms images based on the received image data for image formation.

Figure 5:
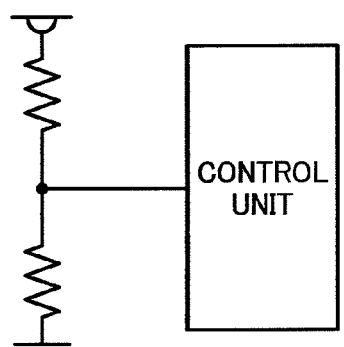
FIG. 5 is a view illustrating an example of a method for implementing image processing using a mode corresponding to the connected scanner unit.

An explanation is now given of the image processing unit 23 provided with the control units 2a and 2b. The image processing unit 23 with the control units 2a and 2b has the same elements but operates using different modes according to the type of the input data (color data, monochrome data) and executes image processing (color image processing, monochrome image processing) according to the type of data. For example, when an operation mode instruction signal that is a signal for operation determination is provided to the image processing unit 23, the image processing unit 23 refers to this signal and executes color image processing if this signal is an "H" level, and executes monochrome image processing if this signal is an "L" level (refer to FIG. 5). In the example shown in FIG. 5, a state of an operation mode instruction signal is made to change by adjusting hardware. Information (operation mode instruction information) for specifying the operating mode is stored in advance in a specific region of the memory unit 5. The image processing unit 23 can then refer to the operation mode instruction information and carry out image processing using an operation mode corresponding to this content.

The image forming apparatus 100 has a configuration where it is possible to connect scanner units of different specifications (structure where the scanner unit can be changed). It is also possible for start-up to take place without the scanner unit connected. During start up, the image forming apparatus 100 confirms whether or not the scanner unit is connected normally and issues an alarm when correction is erroneous.

Figure 6:
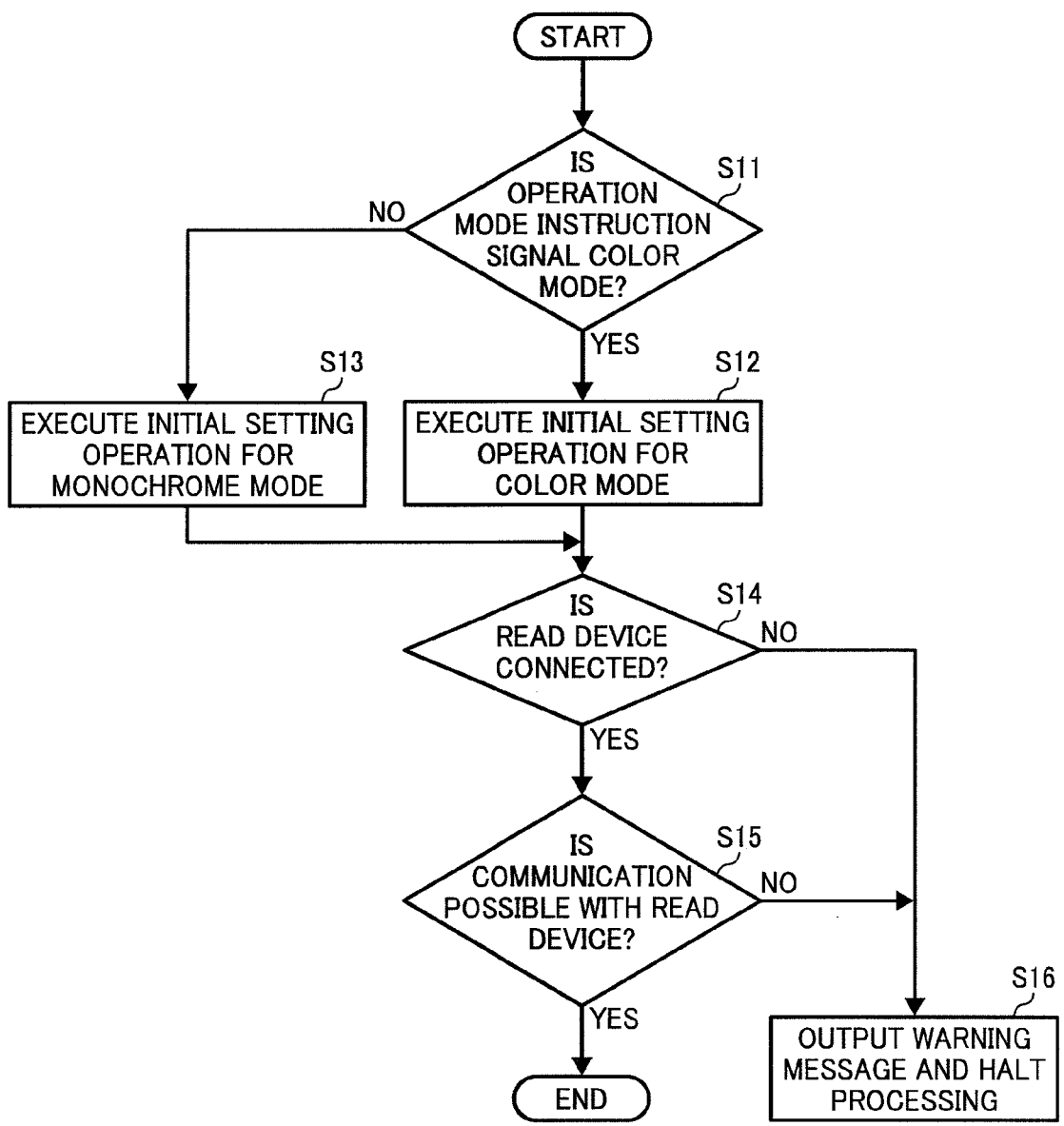
FIG. 6 is a flowchart of an example of an operation executed during start-up of the image forming apparatus of the embodiments.

The operation of the image forming apparatus 100 at the time of start-up is explained based on FIG. 6. FIG. 6 is a flowchart of an example of an operation executed while the image forming apparatus 100 is starting up. An example is given here where the image processing unit 23 carries out an erroneous detection.

When the image forming apparatus 100 starts up, the image processing unit 23 first confirms whether the color mode is designated as the operating mode (Step S11). The operation mode determination can use the operation mode instruction signal and the operation mode instruction information etc. When the operation mode instruction is for the color mode (Yes at Step S11), an operation starts in color mode and execution of an initial setting operation is executed (Step S12). When the initial setting operation ends, it is confirmed whether or not the original document reader is connected (Step S14). When the original document reader is connected (Yes at Step S14), it is confirmed whether communication with the original document reader is possible (Step S15). If communication with the original document reader is possible (Yes at Step S15), it is determined that the original document reader is connected normally. The start-up operation then ends, and normal operation commences. On the other hand, when it is determined in Step S14 that the original document reader is not connected (No at Step S14), and when it is determined that communication with the original document reader is not possible in Step S15 (No at Step S15), a warning message is output and processing is halted (Step S16).

When the operation mode instruction is a monochrome mode (No at Step S11), operation is started in monochrome mode. Step S14 is then proceeded to after the initial settings operation is executed in Step S12. The operation of Step S14 onwards is similar to the operation at the time of starting in color mode.

Details of abnormalities detected can then be displayed at a display unit (not shown) while outputting the warning message. It is also possible to execute just one of each of the processes (Step S14, Step S15) for detecting abnormalities in FIG. 6.

It is possible to prevent erroneous operation by executing the following processing. It is also possible for the user to be notified to this effect when an erroneous operation occurs.

With the image forming apparatus 100, control units (control units 2a, 2b) compatible with the specification of connectable original document readers are prepared in advance, with one of the control units then being mounted according to the original document reader actually connected. It is therefore possible to easily implement two models (of image forming apparatuses) simply by changing the control unit and portions other than the control units can be shared between devices. Downsizing of the device is therefore possible. This means that prices can be reduced.

According to one aspect of the present invention, it is possible to downsize the device reduce the price of the device. Moreover, it is possible for image data of the same format to be generated regardless of the specification of the original document reader connected. Furthermore, image forming can be correctly carried out.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a reader connecting unit capable of being connected with a color original document reader that reads original documents in color mode and a monochrome original document reader that reads original documents in monochrome mode, wherein the reader connecting unit is connected only with one of the color original document reader and the monochrome original document reader;
a control unit configured to be capable of exchanging a color image data generating circuit board substrate and a monochrome image data generating unit circuit board substrate, wherein
the control unit is provided only with one of the color image data generating circuit board substrate and the monochrome image data generating circuit board substrate,
the color image data generating circuit board substrate converts a format of color data received from the color original document reader connected to the reader connecting unit to a prescribed format, and generates image data from the converted format of color data, and
the monochrome image data generating unit circuit board substrate converts a format of monochrome data received from the monochrome original document reader connected to the reader connecting unit to the prescribed format, and generates image data from the converted format of monochrome data; and an image forming unit that forms an image based on the image data, wherein the color image data generating circuit board substrate is provided when the color original document reader is connected to the reader connecting unit and the monochrome image data generating circuit board substrate is provided when the monochrome original document reader is connected to the reader connecting unit.

2. The image forming apparatus according to claim 1, wherein the monochrome image data generating circuit board substrate comprises:

a speed adjustment unit that adjusts data speed of the monochromatic data to a desired data speed; and an image data generating unit that generates the image data based on the monochrome data after speed adjustment.

3. An image forming method realized on an image forming apparatus connectable with an original document reader, the original document reader being one of a color original document reader that reads original documents in color mode and a monochrome original document reader that reads original documents in monochrome mode, the image forming method comprising:

receiving original document data from the original document reader, wherein the image forming apparatus is connected only with one of the color original document reader and the monochrome original document reader;

subjecting the original document data to prescribed processing corresponding to the format of the original document data and generating image data, wherein the subjecting includes one of when a color original document reader is connected to the image forming apparatus, converting by a color image data generating unit circuit board substrate a format of color data received as the original document data to a prescribed format and generating the image data from format converted color data; and when a monochromatic original document reader is connected to the image forming apparatus, converting by a monochrome image data generating unit circuit board substrate a format of monochromatic data received as the original document data to the prescribed format and generating the image data from format converted monochromatic data, wherein a control unit is configured to be capable of exchanging the color image data generating unit circuit board substrate and the monochrome image data generating circuit board substrate, wherein the control unit is provided only with one of the color image data generating circuit board substrate and the monochrome image data generating circuit board substrate; and forming an image based on the image data.

4. The image forming method according to claim 3, wherein the converting a format of monochromatic data includes adjusting data speed of the monochromatic data to a desired data speed; and generating the image data based on the monochrome data after speed adjustment.

* * * * *